United States Patent
Li

(10) Patent No.: US 10,681,175 B2
(45) Date of Patent: Jun. 9, 2020

(54) MULTI-SERVER NODE SERVICE PROCESSING AND CONSENSUS METHOD AND DEVICE

(71) Applicant: Alibaba Group Holding Limited, George Town (KY)

(72) Inventor: Yi Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/516,483

(22) Filed: Jul. 19, 2019

(65) Prior Publication Data

US 2019/0342422 A1 Nov. 7, 2019

Related U.S. Application Data

(63) Continuation of application No. PCT/CN2018/080461, filed on Mar. 26, 2018.

(30) Foreign Application Priority Data

Mar. 28, 2017 (CN) .......................... 2017 1 0191462

(51) Int. Cl.
*H04L 29/08* (2006.01)
*H04L 9/08* (2006.01)

(52) U.S. Cl.
CPC ............ *H04L 67/32* (2013.01); *H04L 9/0825* (2013.01); *H04L 67/10* (2013.01); *H04L 67/1008* (2013.01)

(58) Field of Classification Search
CPC ... H04L 67/32; H04L 9/0825; H04L 67/1008; H04L 67/10
See application file for complete search history.

(56) References Cited

U.S. PATENT DOCUMENTS 7,886,023 B1 * 2/2011 Johnson .............. H04L 67/1002
709/219
2005/0050227 A1 3/2005 Michelman
(Continued)

FOREIGN PATENT DOCUMENTS

| CN | 105450757 | 3/2016 |
| CN | 105488665 | 4/2016 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Lance Leonard Barry
(74) *Attorney, Agent, or Firm* — Fish & Richardson P.C.

(57) ABSTRACT

This specification describes techniques for service processing. One example method includes receiving, by a first server of a first blockchain node in a consensus network, a service request sent by a client, wherein the consensus network further comprises a plurality of second blockchain nodes, each blockchain node of the consensus network comprising a corresponding plurality of servers; storing the service request in at least one service memory of the first blockchain node; obtaining, by the first blockchain node and from a registration center, addresses of the corresponding plurality of servers of the plurality of second blockchain nodes in the consensus network; and sending the service request to each second blockchain node in the consensus network based on the obtained addresses, wherein each second blockchain node stores the service request in a corresponding at least one service memory after receiving the service request.

20 Claims, 12 Drawing Sheets

(56) References Cited

U.S. PATENT DOCUMENTS

| | | | |
|---|---|---|---|
| 2015/0271008 A1* | 9/2015 | Jain | H04L 41/0686 |
| | | | 714/57 |
| 2016/0261404 A1 | 9/2016 | Ford et al. | |
| 2017/0031676 A1 | 2/2017 | Cecchetti et al. | |
| 2017/0048209 A1 | 2/2017 | Lohe et al. | |
| 2018/0025435 A1* | 1/2018 | Karame | G06Q 40/12 |
| | | | 705/30 |
| 2018/0097779 A1* | 4/2018 | Karame | G06Q 20/065 |
| 2018/0343128 A1* | 11/2018 | Uhr | H04L 63/1483 |
| 2019/0005470 A1* | 1/2019 | Uhr | H04L 9/3265 |
| 2019/0179801 A1* | 6/2019 | Jang | G06F 16/1865 |

FOREIGN PATENT DOCUMENTS

| | | |
|---|---|---|
| CN | 106384236 | 2/2017 |
| CN | 106385319 | 2/2017 |
| CN | 106452785 | 2/2017 |
| CN | 107395659 | 11/2017 |
| RU | 2554570 | 6/2015 |
| TW | 201627889 | 8/2016 |
| WO | WO-2018126858 A1 * 7/2018 ......... G06F 21/6245 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2018/080461, dated May 30, 2018, 12 pages (with partial English translation).
PCT International Preliminary Report on Patentability in International Application No. PCT/CN2018/080461, dated Oct. 1, 2019, 11 pages (with English translation).
Mastering Bitcoin: Unlocking Digital Cryptocurrencies, 1st ed., O'Reilly Media, Inc., Dec. 2014, pp. 15-29, 139-167, and 211.
Extended European Search Report Application No. 18775664.8, dated Dec. 10, 2019, 7 pages.

* cited by examiner

MULTI-SERVER NODE SERVICE PROCESSING AND CONSENSUS METHOD AND DEVICE

CROSS-REFERENCE TO RELATED APPLICATIONS

This application is a continuation of PCT Application No. PCT/CN2018/080461, filed on Mar. 26, 2018, which claims priority to Chinese Patent Application No. 201710191462.X, filed on Mar. 28, 2017, and each application is hereby incorporated by reference in its entirety.

TECHNICAL FIELD

The present application relates to the field of computer technologies, and in particular, to a service processing and consensus method and device.

BACKGROUND

With continuous development of computer technologies, the blockchain technology is more widely applied. In addition to implementing effective data registration, people also use the blockchain technology to provide a new idea for implementing some services.

Currently, performing service processing by using the blockchain technology roughly includes two processes: service processing process and service consensus process. In the service processing process, a blockchain node receives a service request sent by a user, and stores the service request in a service memory of the blockchain node. In addition, the blockchain node broadcasts the service request to other blockchain nodes in a consensus network, so that the other blockchain nodes store the service request in a service memory corresponding to the other blockchain nodes after receiving the service request.

In the service consensus process, a blockchain node obtains a certain quantity of service requests from a service memory corresponding to the blockchain node, and processes the obtained service requests to obtain a preprocessing block. Then, the blockchain node broadcasts the preprocessing block to other blockchain nodes in a consensus network, so that the other blockchain nodes performs service consensus on the preprocessing block after receiving the preprocessing block.

It can be learned from the previously described two processes that the process of a blockchain service can be effectively completed only through close cooperation between blockchain nodes in the consensus network. However, in practice, a blockchain node is usually restricted by a single server, which causes relatively low stability. Once an exception, a program restart, etc., occurs in the server, the blockchain node is unavailable, which affects stability of the entire consensus network, and affects the process of a blockchain service. In addition, software and hardware resources of a single server are very limited, which causes relatively low efficiency when the blockchain node performs service processing.

SUMMARY

Implementations of the present application provide a service processing method, so as to resolve problems in the existing technology that stability is relatively poor and service processing efficiency is relatively poor when a blockchain node performs service processing.

An implementation of the present application provides a service processing method, including the following: receiving, by a first blockchain node and by using a server included in the first blockchain node, a service request sent by a client, where the first blockchain node includes a plurality of servers and at least one service memory; storing the service request in the service memory included in the first blockchain node; and sending the service request to each second blockchain node in a consensus network, so that each second blockchain node stores the service request in a service memory included in the second blockchain node after receiving the service request, where the second blockchain node includes a plurality of servers and at least one service memory.

Implementations of the present application provide a service processing device, so as to resolve problems in the existing technology that stability is relatively poor and service processing efficiency is relatively poor when a blockchain node performs service processing.

An implementation of the present application provides a service processing device, including the following: a receiving module, configured to receive a service request sent by a client; a storage module, configured to store the service request in a service memory corresponding to the service processing device; and a sending module, configured to send the service request to each second blockchain node in a consensus network, so that each second blockchain node stores the service request in a service memory included in the second blockchain node after receiving the service request, where the second blockchain node includes a plurality of servers and at least one service memory.

Implementations of the present application provide a service processing method, so as to resolve problems in the existing technology that stability is relatively poor and service processing efficiency is relatively poor when a blockchain node performs service processing.

An implementation of the present application provides a service processing method, including the following: receiving, by a second blockchain node by using a server included in the second blockchain node, a service request sent by a first blockchain node, where the second blockchain node includes a plurality of servers and at least one service memory, and the first blockchain node includes a plurality of servers and at least one service memory; and storing the service request in the service memory included in the second blockchain node.

Implementations of the present application provide a service processing device, so as to resolve problems in the existing technology that stability is relatively poor and service processing efficiency is relatively poor when a blockchain node performs service processing.

An implementation of the present application provides a service processing device, including the following: a request receiving module, configured to receive a service request sent by a first blockchain node, where the first blockchain node includes a plurality of servers and at least one service memory; and a request storage module, configured to store the service request in a service memory corresponding to the device.

Implementations of the present application provide a service processing method, so as to resolve problems in the existing technology that stability is relatively poor and service processing efficiency is relatively poor when a blockchain node performs service processing.

An implementation of the present application provides a service processing method, including the following: receiving, by a client, service information entered by a user;

generating a corresponding service request based on the service information; and sending the service request to a server included in a first blockchain node, so that the first blockchain node stores the received service request in a service memory included in the first blockchain node; and sending the service request to each second blockchain node in a consensus network, where the first blockchain node includes a plurality of servers and at least one service memory, and the second blockchain node includes a plurality of servers and at least one service memory.

Implementations of the present application provide a service processing device, so as to resolve problems in the existing technology that stability is relatively poor and service processing efficiency is relatively poor when a blockchain node performs service processing.

An implementation of the present application provides a service processing device, including the following: an information receiving module, configured to receive service information entered by a user; a request generation module, configured to generate a corresponding service request based on the service information; and a sending module, configured to send the service request to a server included in a first blockchain node, so that the first blockchain node stores the received service request in a service memory included in the first blockchain node; and send the service request to each second blockchain node in a consensus network, where the first blockchain node includes a plurality of servers and at least one service memory, and the second blockchain node includes a plurality of servers and at least one service memory.

Implementations of the present application provide a service consensus method, so as to resolve problems in the existing technology that stability is relatively poor and service processing efficiency is relatively poor when a blockchain node performs service processing.

An implementation of the present application provides a service consensus method, including the following: selecting, by a first blockchain node, a server from a plurality of servers included in the first blockchain node, where the first blockchain node includes the plurality of servers and at least one service memory; obtaining at least one service request from the service memory included in the first blockchain node by using the selected server; and packaging the at least one service request into a preprocessing block by using the selected server, and sending the preprocessing block to each second blockchain node in a consensus network, so that each second blockchain node performs service consensus on the preprocessing block, where the second blockchain node includes a plurality of servers and at least one service memory.

Implementations of the present application provide a service consensus device, so as to resolve problems in the existing technology that stability is relatively poor and service processing efficiency is relatively poor when a blockchain node performs service processing.

An implementation of the present application provides a service consensus device, including the following: a request acquisition module, configured to obtain at least one service request from a service memory corresponding to the device; and a sending module, configured to package the at least one service request into a preprocessing block, and send the preprocessing block to each second blockchain node in a consensus network, so that each second blockchain node performs service consensus on the preprocessing block, where the second blockchain node includes a plurality of servers and at least one service memory.

Implementations of the present application provide a service consensus device, so as to resolve problems in the existing technology that stability is relatively poor and service processing efficiency is relatively poor when a blockchain node performs service processing.

An implementation of the present application provides a service consensus device, including the following: a selection module, configured to select a server from a plurality of servers included in a first blockchain node, where the first blockchain node includes the plurality of servers and at least one service memory.

Implementations of the present application provide a service consensus method, so as to resolve problems in the existing technology that stability is relatively poor and service processing efficiency is relatively poor when a blockchain node performs service processing.

An implementation of the present application provides a service consensus method, including the following: obtaining, by a blockchain node, a preprocessing block by using a first server included in the blockchain node, where the blockchain node includes a plurality of servers and at least one service memory; and performing service consensus on the preprocessing block by using the first server based on each service request stored in the service memory included in the blockchain node.

Implementations of the present application provide a service consensus device, so as to resolve problems in the existing technology that stability is relatively poor and service processing efficiency is relatively poor when a blockchain node performs service processing.

An implementation of the present application provides a service consensus device, including the following: an acquisition module, configured to obtain a preprocessing block; and a consensus module, configured to perform service consensus on the preprocessing block based on each service request stored in a service memory corresponding to the device.

Implementations of the present application provide a service processing method, so as to resolve problems in the existing technology that stability is relatively poor and service processing efficiency is relatively poor when a blockchain node performs service processing.

An implementation of the present application provides a service processing method, including the following: obtaining, by a registration center, addresses of a plurality of servers included in each blockchain node in a consensus network, where each blockchain node includes the plurality of servers and at least one service memory; and sending the obtained addresses of the plurality of servers included in the blockchain node to other blockchain nodes in the consensus network and a client for storage.

Implementations of the present application provide a service processing device, so as to resolve problems in the existing technology that stability is relatively poor and service processing efficiency is relatively poor when a blockchain node performs service processing.

An implementation of the present application provides a service processing device, including the following: an acquisition module, configured to obtain addresses of a plurality of servers included in each blockchain node in a consensus network, where each blockchain node includes the plurality of servers and at least one service memory; and a sending module, configured to send the obtained addresses of the plurality of servers included in the blockchain node to other blockchain nodes in the consensus network and a client for storage.

At least one technical solution described above and used in the implementations of the present application can achieve the following beneficial effects:

In the implementations of the present application, a first blockchain node includes a plurality of servers. The first blockchain node can receive a service request sent by a client and store the service request by using one server included in the first blockchain node, obtain at least one service request from a service memory included in the first blockchain node by using the server included in the first blockchain node, obtain a preprocessing block, and send the preprocessing block to each second blockchain node in a consensus network by using the server, to perform service consensus on the preprocessing block by using each second blockchain node. It can be ensured that the first blockchain node is available, provided that one server in the plurality of servers included in the first blockchain node is available. Therefore, stability of the first blockchain node in the consensus network is greatly improved. In addition, each server included in the first blockchain node can receive the service request sent by a user by using the client, and each server can initiate service consensus to each second blockchain node in the consensus network. Therefore, service processing efficiency of a blockchain service is greatly improved.

BRIEF DESCRIPTION OF DRAWINGS

The accompanying drawings described here are intended to provide a further understanding of the present application, and constitute a part of the present application. The illustrative implementations of the present application and descriptions of the implementations of the present application are intended to describe the present application, and do not constitute limitations on the present application. In the accompanying drawings.

DESCRIPTION OF IMPLEMENTATIONS

To make a person skilled in the art understand the technical solutions in the present application better, the following clearly and completely describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

Figure 1:
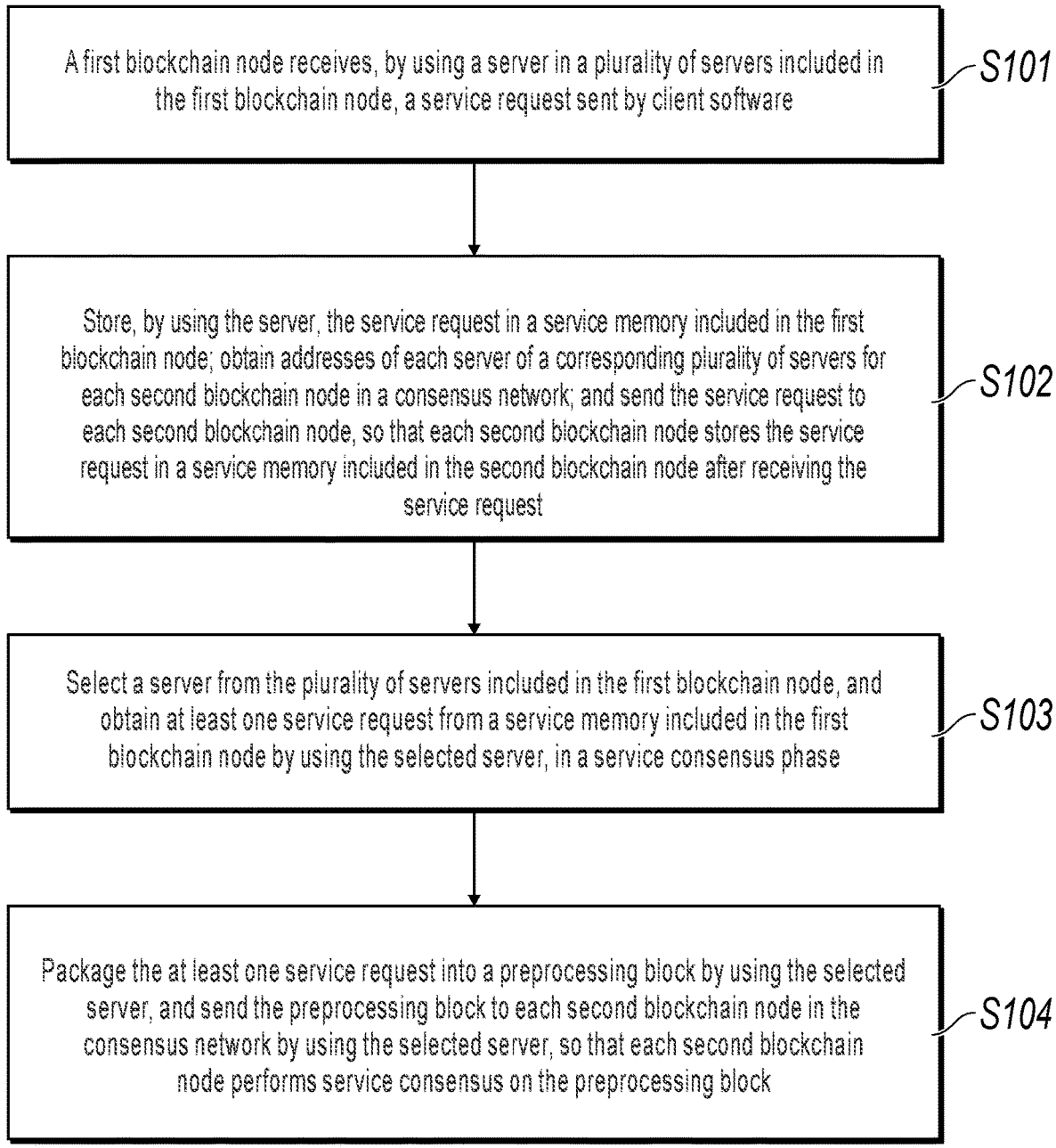
FIG. 1 is a schematic diagram illustrating a service consensus process, according to an implementation of the present application.

FIG. 1 is a schematic diagram illustrating a service consensus process, according to an implementation of the present application, specifically including the following steps.

S101. A first blockchain node receives, by using a server in a plurality of servers included in the first blockchain node, a service request sent by a client.

In this implementation of the present application, in a service processing process, a user can send a service request to a first blockchain node by using a client. The client mentioned here can be a client installed on an end-user device held by the user. The user can start the client on the end-user device, and enter service information on an interface displayed by the client to the user. After receiving the service information entered by the user, the client can generate a corresponding service request based on service logic pre-stored in the client, and send the service request to the first blockchain node by using the end-user device.

Certainly, in this implementation of the present application, the user can directly enter corresponding service information to the end-user device, and the end-user device can generate a corresponding service request based on the service information entered by the user, and send the service request to the first blockchain node.

In this implementation of the present application, the first blockchain node includes a plurality of servers (in other words, the first blockchain node includes a server cluster, and the server cluster is equivalent to the first blockchain node), and the servers share node configuration information such as point-to-point routing table, asymmetric public/private key of a node, and node identity (ID). Therefore, for other blockchain nodes in a consensus network and the client, operations performed by the servers in the first blockchain node are all considered to be performed by the first blockchain node.

Therefore, when sending the service request to the first blockchain node, the client first needs to determine a server in the first blockchain node that the service request should be sent to. Therefore, this implementation of the present application provides a registration center. The registration center is configured to manage addresses of servers in a blockchain node, and push the addresses of the servers to the client. The client can randomly select an address from the addresses pushed by the registration center, and send the service request to a server corresponding to the address, which is shown in FIG. 2.

Figure 2:
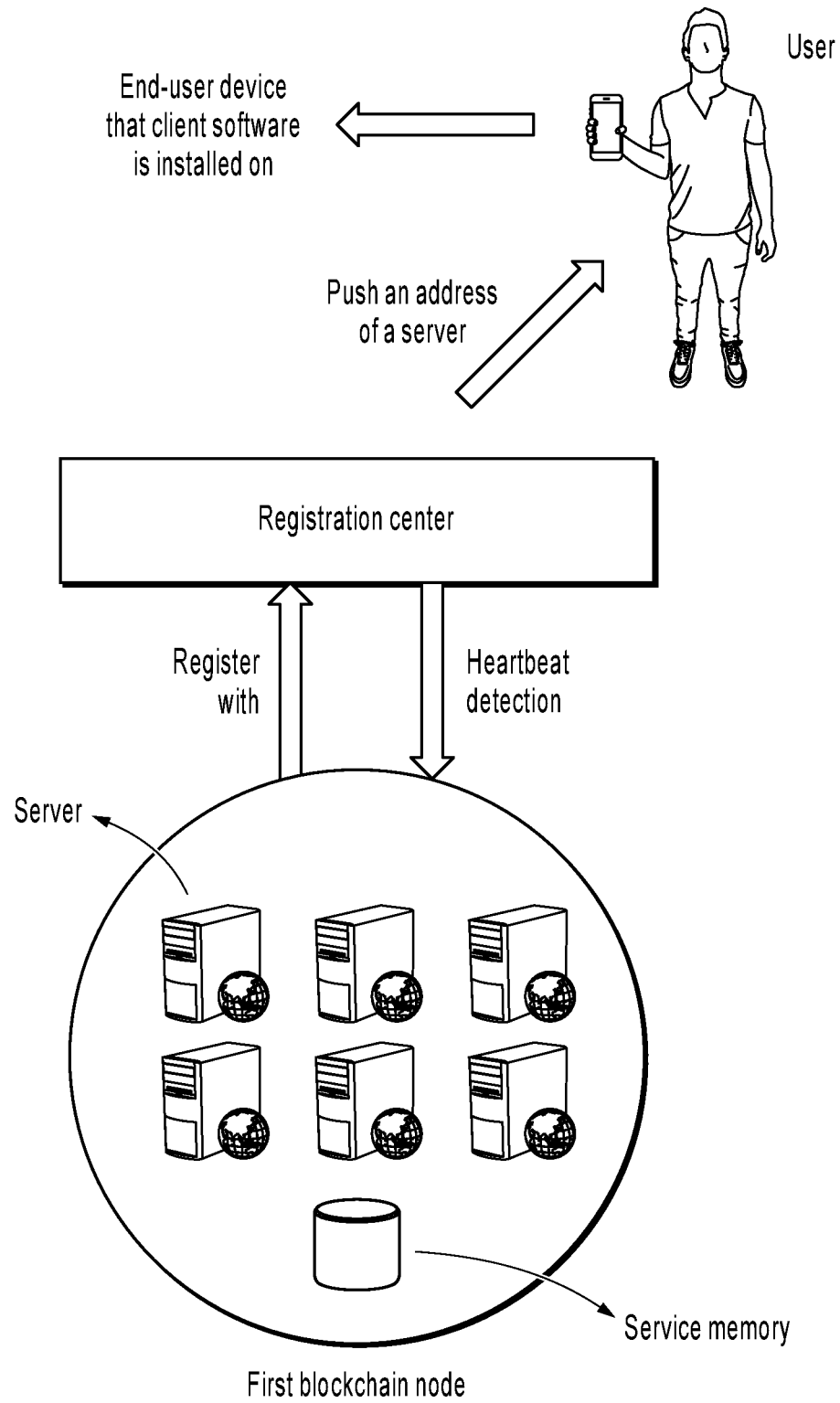
FIG. 2 is a schematic diagram of pushing an address to a client by a registration center, according to an implementation of the present application.

FIG. 2 is a schematic diagram of pushing an address to a client by a registration center, according to an implementation of the present application.

In FIG. 2, the first blockchain node includes the plurality of servers, and each server can register with the registration center when being online ("online" mentioned here means that the server starts to normally perform service processing), in other words, notify the registration center that the server is currently in an available state and can receive the service request sent by the client. After determining that the server is online, the registration center can obtain an address of the server, and then push the address to the client, so that the client stores the address after receiving the address.

In this implementation of the present application, the registration center can proactively obtain the address of the server from the server, or the server can provide the address for the registration center. For example, after the server registers with the registration center, the registration center can return a Registration Successful message to the server. The server can proactively send the address of the server to the registration center after receiving the message, so that the registration center manages the address.

Besides that the registration center can proactively push the obtained address to the client, the client can also proactively obtain addresses managed by the registration center. For example, in addition to sending the service request to the first blockchain node, the client can further send an address acquisition query message to the registration center. After receiving the query message, the registration center can send an address of a currently available server (namely, a server currently registering with the registration center) in the first blockchain node to the client, so that after receiving addresses sent by the registration center, the client selects an address from the addresses, and sends the service request to a server corresponding to the selected address. Certainly, the client can also obtain the addresses of the servers included in the first blockchain node from the registration center by using other methods. Details are omitted here.

It is worthwhile to note that in practice, a server in the first blockchain node is possibly offline (in other words, the server cannot perform service processing) because of a running fault, a program restart, etc. If the registration center sends an address of the offline server to the client, and the client exactly selects the address of the offline server during server selection, the client possibly cannot send the service request to the first blockchain node, and the first blockchain node cannot process the service request.

To avoid the problems, in this implementation of the present application, the registration center can regularly send a heartbeat detection message to each server that has registered with the registration center. The server can return a response message to the registration center based on the received heartbeat detection message when running normally online. After receiving the response message, the registration center can determine that the server is normally running online, and continues to manage an address of the server.

After sending the heartbeat detection message to the server, if detecting that no response message returned by the server based on the heartbeat detection message is received after a specified time elapses, the registration center can determine that the server is possibly offline currently because of a running fault, a program restart, etc., and does not push the address of the server to the client. In addition, if the registration center has pushed the address of the server to the client, the registration center can send a notification that the server is offline to the client, so that the client locally deletes the address of the server based on the notification.

After deleting the address of the offline server, the client does not send the service request to the server. When the server is back online, the client re-obtains the address of the server from the registration center, and sends the service request to the server by using the address.

It is worthwhile to note that FIG. 2 is merely described by using an example that the client obtains the addresses included in the first blockchain node from the registration center. In FIG. 2, because the first blockchain node can receive the service request sent by the client from the client, the servers in the first blockchain node need to register with the registration center, so that the registration center can push the addresses of the servers in the first blockchain node to the client, and the client can send the service request to the servers in the first blockchain node by using the obtained addresses.

However, in practice, second blockchain nodes in the consensus network can also receive the service request sent by the client, and process the service request. Therefore, in this implementation of the present application, servers included in each second blockchain node in the consensus network can also register with the registration center, so that the registration center can push addresses of the servers included in the second blockchain node to the client. As such, the client can also send the service request to the servers in the second blockchain node by using the obtained addresses.

S102. Store, by using the server, the service request in a service memory included in the first blockchain node, and send the service request to each second blockchain node in a consensus network, so that each second blockchain node stores the service request in a service memory included in the second blockchain node after receiving the service request.

After receiving the service request sent by the client, the server included in the first blockchain node can store the service request in the service memory included in the first blockchain node. In addition, the server can send the service request sent by the client to each second blockchain node in the consensus network, so that the second blockchain node stores the service request in the service memory included in the second blockchain node after receiving the service request.

The server in the first blockchain node can first perform valid verification on the service request after receiving the service request. The valid verification can be valid verification by using an asymmetric signature such as an RSA algorithm, or can be verification in other forms. When determining that the service request succeeds in the valid verification, the server can store the service request in the service memory included in the first blockchain node, and send the service request to each second blockchain node in the consensus network. When determining that the service request does not succeed in the valid verification, the server does not store the service request, but can return a message indicating that the service request fails to be processed to the client, so that the user performs certain operations after reading the message by using the client. For example, the user can re-edit the service request in the client and send an edited service request to the server included in the first blockchain node by using the client after reading the message.

In this implementation of the present application, each blockchain node in the consensus network can include a plurality of servers. Therefore, when sending the service request to the second blockchain node, the server in the first blockchain node also needs to obtain addresses of the servers in the second blockchain node, and then sends the service request to the servers included in the second blockchain node by using the obtained addresses.

Figure 3:
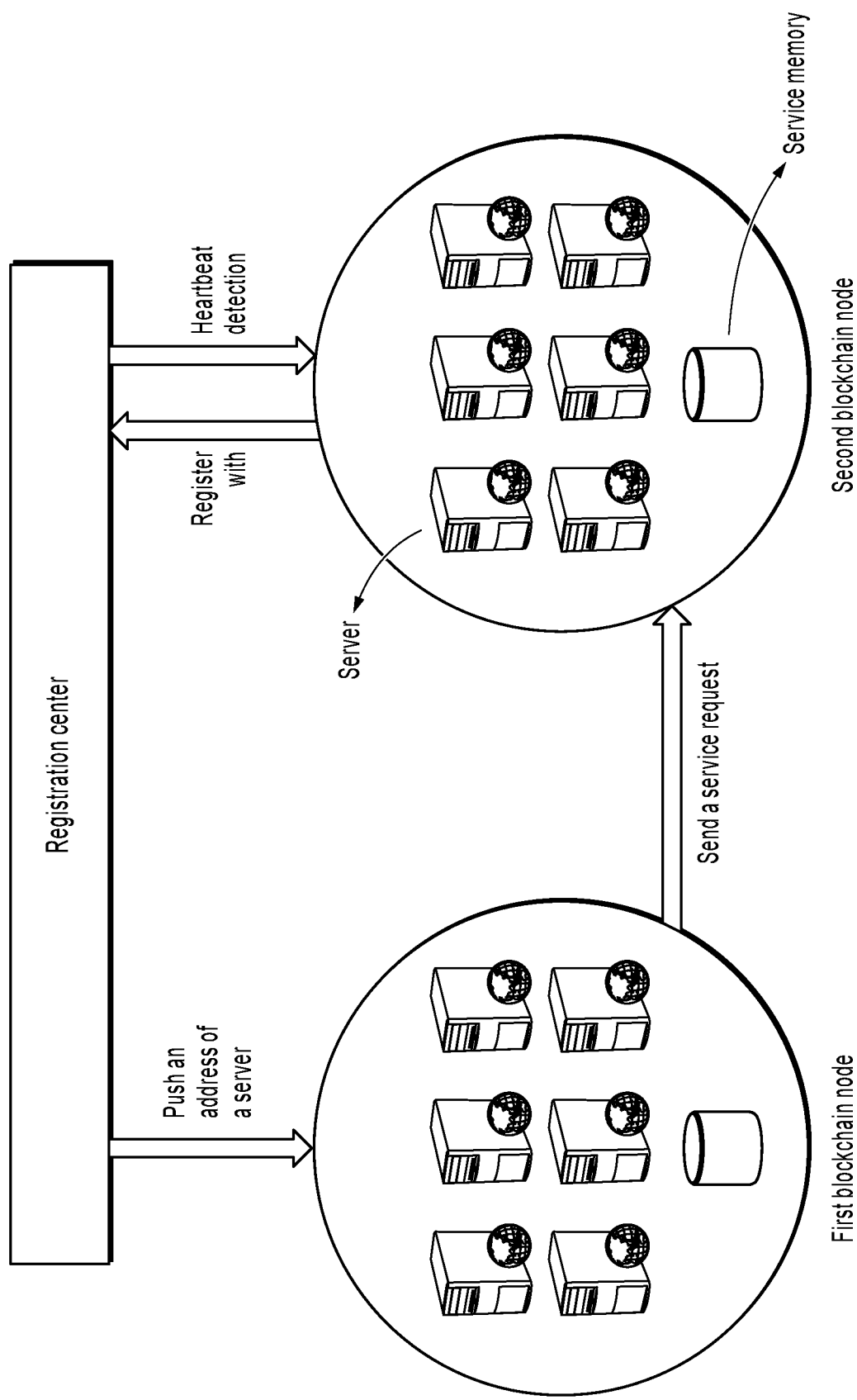
FIG. 3 is a schematic diagram of pushing an address of each server in a second blockchain node to each server in a first blockchain node by a registration center, according to an implementation of the present application.

Therefore, in this implementation of the present application, the registration center also needs to manage the addresses of the servers in the second blockchain node, and sends the addresses of the servers in the second blockchain node to each server in the first blockchain node, which is shown in FIG. 3.

FIG. 3 is a schematic diagram of pushing an address of each server in a second blockchain node to each server in a first blockchain node by a registration center, according to an implementation of the present application.

In FIG. 3, the servers in the second blockchain node can also register with the registration center after being online, so that the registration center obtains the addresses of the servers in the second blockchain node. The registration center can proactively obtain the addresses from the servers in the second blockchain node, or the servers in the second blockchain node can proactively send their addresses to the registration center. A specific method is the same as the previously described method in step S101 of obtaining the addresses of the servers in the first blockchain node by the registration center, and details are omitted here.

After obtaining the addresses of the servers in the second blockchain node by using the registration center, each server in the first blockchain node can store the obtained addresses. When sending the service request to the second blockchain node, the server in the first blockchain node can select an address from the stored addresses included in the second blockchain node, and then send the service request to a server corresponding to the address, so that the server corresponding to the address stores the service request in the service memory corresponding to the second blockchain node after receiving the service request.

The server in the second blockchain node can also perform valid verification on the service request after receiving the service request. The server can store the service request in the service memory included in the second blockchain node when determining that the service request succeeds in the valid verification. The server does not store the service request when determining that the service request does not succeed in the valid verification.

It is worthwhile to note that the servers included in the second blockchain node are also possibly offline as mentioned in step S101. Therefore, after obtaining the addresses of the servers in the second blockchain node, the registration center can regularly send a heartbeat detection message to the servers corresponding to these addresses. When receiving a response message returned by a server based on the heartbeat detection message after a specified time elapses (or within a specified time), the registration center can determine that the server is still in an online state, and continues to manage an address of the server. When not receiving the response message returned by the server based on the heartbeat detection message after the specified time elapses, the registration center can determine that the server is possibly offline because of a running fault, network instability, etc., and does not continue to manage the address of the server until the server is back online.

In addition, when determining, by using the previously described method, that a certain server in the second blockchain node is offline, the registration center can send a notification that the server is offline to the servers in the first blockchain node and the client, so that the servers in the first blockchain node and the client delete an address of the server after receiving the notification, and subsequently do not send the service request to the server corresponding to the address until the server is back online. After re-obtaining the address of the server from the registration center, the servers in the first blockchain node and the client can send the service request to the server corresponding to the address by using the obtained address.

FIG. 3 merely shows a case that servers included in one second blockchain node register with a registration center. In practice, there are a plurality of second blockchain nodes in a consensus network. Therefore, servers in each second blockchain node in the consensus network can register with the registration center after being online, so that the registration center obtains addresses of the servers in the second blockchain node, and pushes the obtained addresses to the servers in the first blockchain node. In other words, each server in the first blockchain node stores the addresses of the servers included in each second blockchain node in the consensus network.

It is worthwhile to note that in practice, the entire consensus network includes a plurality of blockchain nodes. The first blockchain node mentioned in this implementation of the present application is a blockchain node that receives the service request sent by the client, and other blockchain nodes than the first blockchain node can be referred to as second blockchain nodes in this implementation of the present application. The first blockchain node and the second blockchain node are relative terms. To be specific, a blockchain node that receives the service request from the client can be referred to as the first blockchain node, and a blockchain node that receives the service request sent by the first blockchain node can be referred to as the second blockchain node. Because the blockchain nodes in the consensus network can all receive the service request sent by the client, the blockchain nodes can be essentially first blockchain nodes, or can be second blockchain nodes. Division between the first blockchain node and the second blockchain node depends on where the service request is received.

Certainly, in a consensus check process, division between the first blockchain node and the second blockchain node can also be determined based on which node initiates the consensus check. To be specific, a consensus check initiator that sends a preprocessing block that includes at least one service request to the consensus network can be the first blockchain node, and a blockchain node that receives the preprocessing block can be referred to as the second blockchain node.

S103. Select a server from the plurality of servers included in the first blockchain node, and obtain at least one service request from a service memory included in the first blockchain node by using the selected server, in a service consensus phase.

In this implementation of the present application, the server in the first blockchain node needs to perform service consensus on the service request in the service memory included in the first blockchain node. Therefore, in the service consensus phase, the server in the first blockchain node can obtain the at least one service request from the service memory included in the first blockchain node, and subsequently package the obtained service request into a preprocessing block and send the preprocessing block to each second blockchain node in the consensus network for service consensus.

In this implementation of the present application, in addition to the plurality of servers and the service memory, the first blockchain node further includes a scheduled task trigger, and the scheduled task trigger is used to periodically initiate service consensus to each blockchain node in the consensus network by using the server in the first blockchain node. However, because the first blockchain node includes the plurality of servers, the scheduled task trigger can select a server from the plurality of servers included in the first blockchain node in the service consensus phase, and then the server obtains the at least one service request from the service memory included in the first blockchain node.

In this implementation of the present application, the scheduled task trigger can be a hardware device, or can be a form of software. For a form of software, the scheduled task trigger can be set in a certain server in the first blockchain node. When running in the server, the scheduled task trigger can select a server from the servers included in the first blockchain node in the service consensus phase, and send a notification to the selected server by using a server that the scheduled task trigger is located in, so that the selected server obtains the at least one request from the service memory included in the first blockchain node after receiving the notification.

In the process of obtaining each service request from the service memory (namely, the service memory included in the first blockchain node), the server can obtain each service request based on the time sequence that each service request stores in the service memory, or can obtain each service request based on the service type of each service request, or can obtain each service request based on the service level of each service request. There are many acquisition methods, and details are omitted here.

S104: Package the at least one service request into a preprocessing block by using the selected server, and send the preprocessing block to each second blockchain node in the consensus network by using the selected server, so that each second blockchain node performs service consensus on the preprocessing block.

After obtaining the at least one service request from the service memory included in the first blockchain node, the server in the first blockchain node can process the obtained service requests, and package the service requests into a preprocessing block. The server can sort the obtained service requests based on a predetermined sorting rule to obtain a sorting result of the service requests, and determine, by using a predetermined identifier determining rule and the sorting result, an identifier to be verified that uniquely corresponds to the service requests. Then, the server can package the obtained service requests, the sorting result of the service requests, and the determined identifier to be verified into one preprocessing block, and then send the preprocessing block to the servers included in the second blockchain node.

Figure 4:
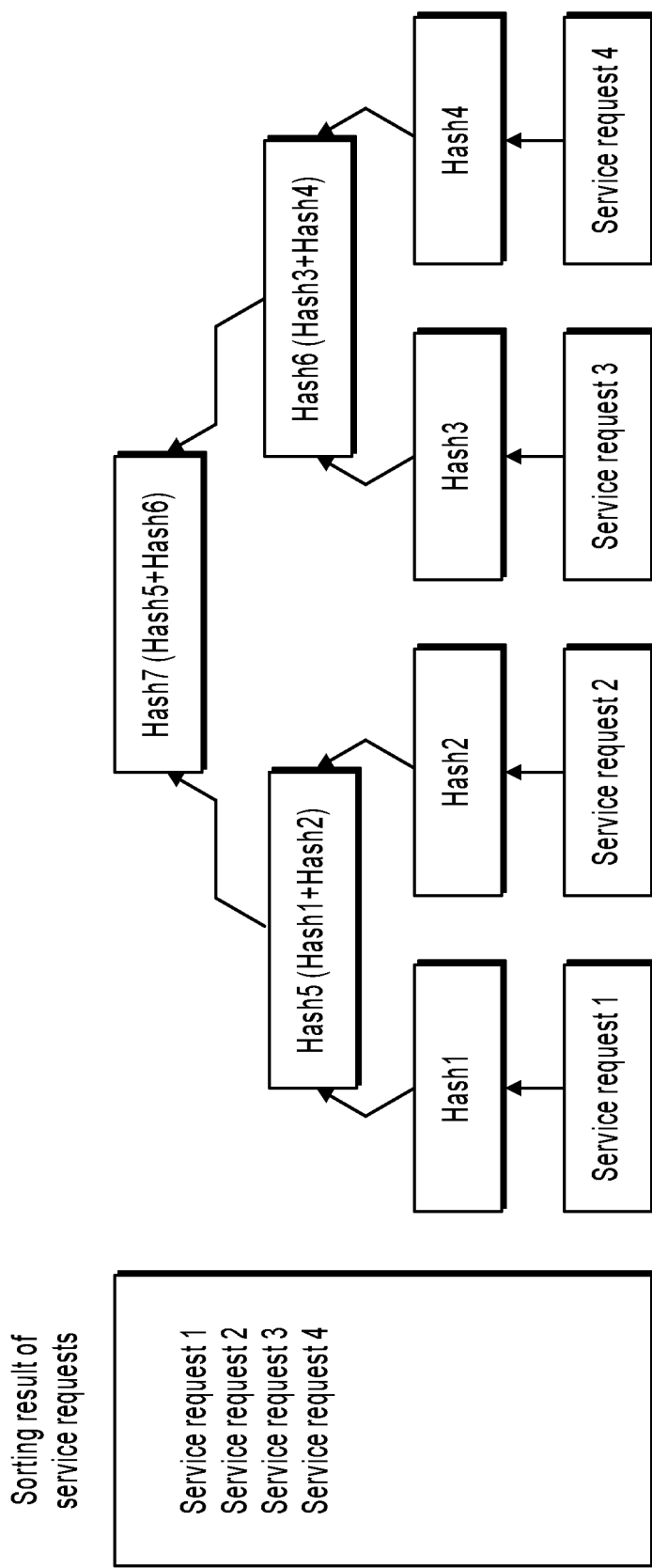
FIG. 4 is a schematic diagram of determining an identifier to be verified by a server, according to an implementation of the present application.

A specific method of determining the identifier to be verified by the server can be shown in FIG. 4.

FIG. 4 is a schematic diagram of determining an identifier to be verified by a server, according to an implementation of the present application.

In FIG. 4, a server in the first blockchain node (namely, a server determined by using the scheduled task trigger included in the first blockchain node) obtains four service requests shown in FIG. 4 from the service memory included in the first blockchain node. The server can sort the four service requests based on a predetermined sorting rule, to obtain a sorting result shown in FIG. 4. Then, the server can separately determine child identifiers Hash1 to Hash4 corresponding to the four service requests based on a predetermined identifier determining rule: a hash algorithm, and place the determined four child identifiers in leaf nodes of a Merkle tree from left to right based on an obtained sorting result, to determine a value Hash7 at the root node of the Merkle tree. The server can determine the determined the value Hash7 at the root node of the Merkle tree as an identifier to be verified that uniquely corresponds to the four service requests, and then package the determined identifier to be verified, the sorting result, and the four service requests into one preprocessing block.

It is worthwhile to note that the method of determining the identifier to be verified shown in FIG. 4 is not unique. For example, in addition to determining the identifier to be verified that uniquely corresponds to the service requests by using the hash algorithm as the predetermined identifier determining rule, the server in the first blockchain node can further determine the identifier to be verified that uniquely corresponds to the service requests by using an algorithm such as a message digest algorithm 5 (MD5), provided that the determined identifier to be verified uniquely corresponds to the service requests. In addition to the form shown in FIG. 4, the Merkle tree can further have other forms. Details are omitted here.

Certainly, in this implementation of the present application, in addition to the Merkle tree, the server in the first blockchain node can further determine the identifier to be verified that uniquely corresponds to the service requests by using other methods. For example, after determining child identifiers corresponding to the service requests, the server can sort the determined child identifiers based on a certain sequence, encrypt the sorted result again, and use the encrypted result as the identifier to be verified that uniquely corresponds to the service requests. Alternatively, after determining child identifiers corresponding to the service requests, the server can generate a universally unique ID by using a snowflake algorithm, and use the ID as the identifier to be verified that uniquely corresponds to the service requests. Alternatively, the server can determine a universally unique identifier (UUID) of the determined child identifiers corresponding to the service requests, and use the UUID as the identifier to be verified that uniquely corresponds to the service requests. Certainly, there are still other determining methods, and details are omitted here, provided that it is ensured that the determined identifier to be verified can uniquely correspond to the service requests.

After determining the preprocessing block, the server in the first blockchain node (namely, the server selected by using the scheduled task trigger in the first blockchain node in the service consensus phase) can send the preprocessing block to each second blockchain node in the consensus network. However, each second blockchain node in the consensus network includes a plurality of servers. Therefore, when sending the preprocessing block, the server in the first blockchain node needs to determine a server in each second blockchain node that the preprocessing block is sent to.

In this implementation of the present application, each server in the first blockchain node can obtain the addresses of the servers included in each second blockchain node in the consensus network from the registration center. Therefore, when the server in the first blockchain node needs to send the preprocessing block to a certain second blockchain node in the consensus network, the server can select an address from the stored addresses of the servers in the second blockchain node (the stored addresses are addresses of servers in the second blockchain node that are in an online state), and send the preprocessing block to a server corresponding to the address, so that the server corresponding to the address performs consensus check on the preprocessing block after receiving the preprocessing block.

There are a plurality of second blockchain nodes in the consensus network. Therefore, when sending the preprocessing block to each second blockchain node, the server in the first blockchain node can separately determine, from the stored addresses by using the previously described method, servers in each second blockchain node that receive the preprocessing block, and then separately send the preprocessing block to the servers in each second blockchain node by using the determined addresses.

For the second blockchain node, after receiving the preprocessing block sent by the server in the first blockchain node, the server included in the second blockchain node can parse the preprocessing block, to determine service requests included in the preprocessing block, a sorting result of the service requests, and an identifier to be verified. Then, the server in the second blockchain node can find service requests that match the service requests included in the preprocessing block from the service memory included in the second blockchain node, and determine, by using a predetermined identifier determining rule and the determined sorting result of the service requests, an identifier that uniquely corresponds to the service requests found from the service memory included in the second blockchain node. The predetermined identifier determining rule mentioned here is the same as the identifier determining rule used by the server in the first blockchain node.

The server in the second blockchain node can compare the determined identifier with the identifier to be verified that is included in the preprocessing block after determining the identifier, and can determine that the preprocessing block succeeds in local consensus check (in other words, which is performed by the server in the second blockchain node) when determining that the two are consistent, and then store a check result in the service memory included in the second blockchain node, and send the check result to other blockchain nodes in the consensus network (the other blockchain nodes mentioned here includes each second blockchain node and the first blockchain node).

The method of sending the check result by the server in the second blockchain node is the same as the method of sending the service request or the preprocessing block to each second blockchain node in the consensus network by the server in the first blockchain node. To be specific, when the server in the second blockchain node needs to send the check result to a certain blockchain node in the consensus network (which can be the second blockchain node, or can be the first blockchain node), the server can select an address from the locally stored addresses of servers in the blockchain node, and send the check result to a server corresponding to the address. After receiving the check result, the server corresponding to the address can store the check result in a service memory included in the blockchain node that the server belongs to.

When the server in the second blockchain node sends the check result to each blockchain node in the consensus network, other servers in the second blockchain node or the server can also receive check results about the preprocessing block that are sent by other blockchain nodes in the consensus network, and store all the received check results in the service memory included in the second blockchain node. Then, the server (the server can be a server that receives the preprocessing block) in the second blockchain node can determine, from the service memory included in the second blockchain node, a check result (including a check result obtained by the server) about the preprocessing block that is obtained by each blockchain node in the consensus network, and determine a comprehensive check result about the preprocessing block that is obtained by each blockchain node in the consensus network. Then, the server can send the determined comprehensive check result to each blockchain node in the consensus network by using a method that is the same as that of sending the check result, and store the comprehensive check result in the service memory included in the second blockchain node.

After the server in the second blockchain node sends the comprehensive check result, other servers in the second blockchain node or the server (namely, a server that sends the comprehensive check result) can also receive a comprehensive check result about the preprocessing block that is sent by each blockchain node (including each second blockchain node and the first blockchain node) in the consensus network, and store the comprehensive check in the service memory included in the second blockchain node.

The server (namely, the server that sends the comprehensive check result) in the second blockchain node can obtain a comprehensive check result sent by other blockchain nodes in the consensus network from the service memory included in the second blockchain node, determine, by using the received comprehensive check result and a comprehensive check result determined by the server, whether the preprocessing block succeeds in the service consensus in the consensus network, and write each service request included in the preprocessing block into a blockchain that the second blockchain node is stored in if determining that each service request included in the preprocessing block succeeds in the service consensus in the consensus network based on the comprehensive check results (including the comprehensive check result determined by the server) stored in the service memory, or otherwise do not write each service request into the blockchain. The server in the second blockchain node can write complete content of each service request into the blockchain, or can write only an information digest of each service request into the blockchain.

The previously described service consensus process is relatively complex. For ease of understanding, the following lists a simple example to clearly describe the process of performing service consensus on the preprocessing block by the server in the second blockchain node, which is shown in FIG. 5.

Figure 5:
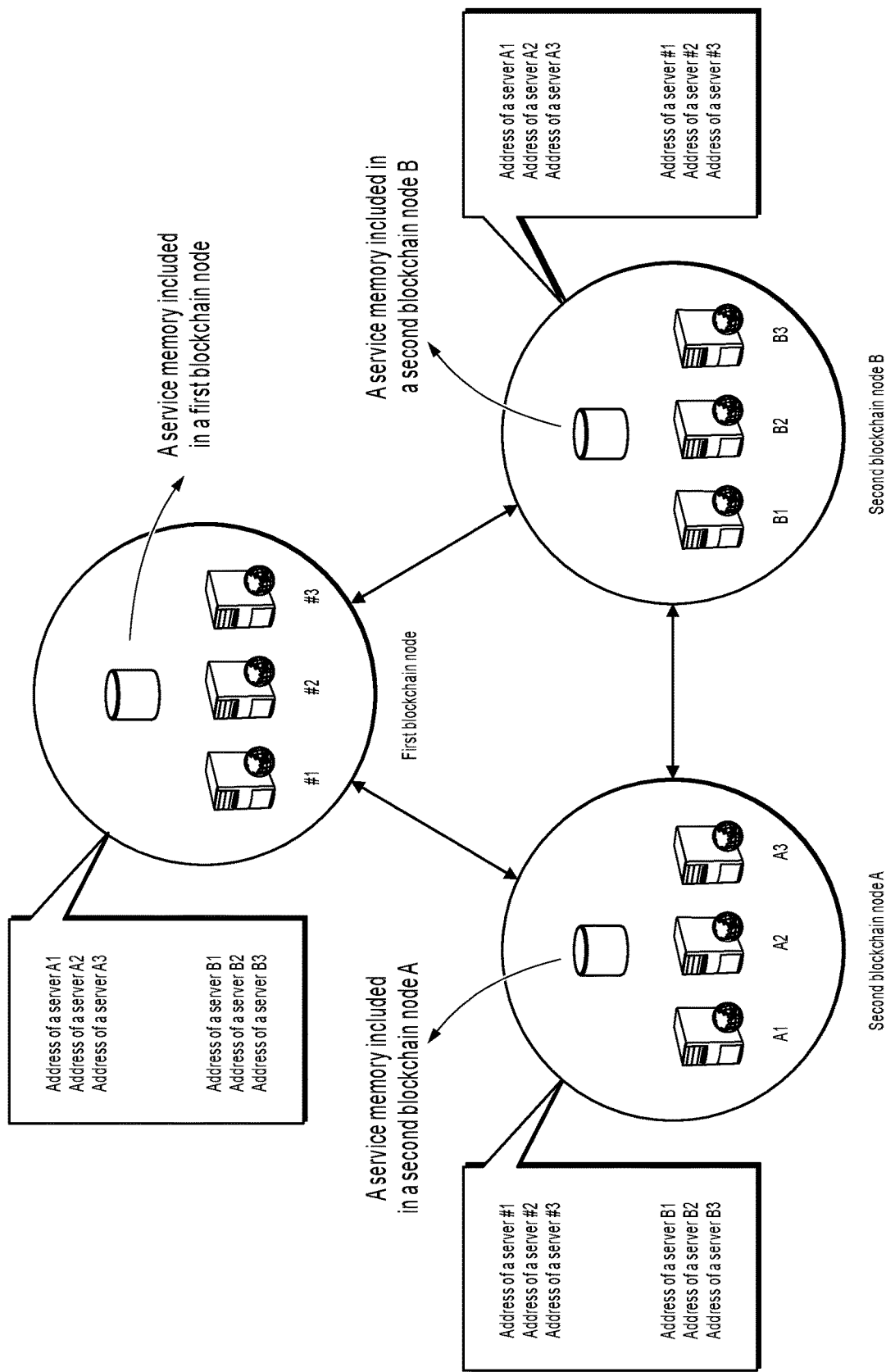
FIG. 5 is a schematic diagram illustrating a process of performing service consensus on a preprocessing block by a server in a second blockchain node, according to an implementation of the present application.

FIG. 5 is a schematic diagram illustrating a process of performing service consensus on a preprocessing block by a server in a second blockchain node, according to an implementation of the present application.

Assume that there are three blockchain nodes in a consensus network: a first blockchain node, a second blockchain node A, and a second blockchain node B. Each server in the three blockchain nodes respectively stores addresses of servers included in the other two blockchain nodes. A server #3 in the first blockchain node obtains at least one service request from a service memory included in the first blockchain node, packages the at least one service request into a preprocessing block, and sends the preprocessing block to the other two blockchain nodes. The server #3 determines to separately send the preprocessing block to a server A1 and a server B1 by using addresses of servers included in the other two blockchain nodes that are stored in the server #3.

After receiving the preprocessing block, the server A1 and the server B1 can perform consensus check on the preprocessing block, and respectively store obtained check results for the preprocessing block in service memories included in blockchain nodes that the server A1 and the server B1 belong to. In addition, the server A1 and the server B1 can respectively send the determined check results to the other two blockchain nodes in the consensus network. The server A1 determines to send a check result obtained by the server A1 to a server #2 in the first blockchain node and a server B2 in the second blockchain node B based on addresses of servers in the other two blockchain nodes that are stored in the server A1, and the server B1 determines to send a check result obtained by the server B1 to the server #3 in the first blockchain node and a server A3 in the second blockchain node A.

After separately receiving the check results sent by the servers in the other two blockchain nodes, servers in the three blockchain nodes in the consensus network can store the received check results in the service memories included in the blockchain nodes. The server A1 (namely, a server that receives the preprocessing block) can obtain check results (including a check result obtained by the server A1) from a service memory included in the second blockchain node A, and obtain a comprehensive check result of the blockchain nodes in the consensus network for the preprocessing block based on these check results. The server A1 can store the obtained comprehensive check result in the service memory included in the second blockchain node A, and send the comprehensive check result to the other two blockchain nodes. The sending method is the same as the method of sending the check result, and details are omitted here. The server #3 (namely, a server that sends a service consensus) and the server B1 (a server that receives the preprocessing block) can also determine a comprehensive check result for the preprocessing block by using such method, and send the obtained comprehensive check result to the other two blockchain nodes in the consensus network.

After receiving the check results sent by the other two blockchain nodes, the servers in the blockchain nodes in the consensus network can store the received check results in the service memories included in the blockchain nodes.

The server A1 can obtain comprehensive check results (including a comprehensive check result obtained by the server A1) for the preprocessing block, which are sent by the blockchain nodes, from the service memory included in the second blockchain node A. Then, the server A1 can determine whether the preprocessing block succeeds in the service consensus in the consensus network based on the comprehensive check results. If yes, the server A1 writes each service request included in the preprocessing block into a blockchain of the second blockchain node A, and if no, the server A1 does not write each service request into the blockchain. Likewise, the server #3 and the server B1 can also obtain, by using such method, comprehensive check results from the service memories included in the blockchain nodes that the server #3 and the server B1 belong to, and determine, based on the obtained comprehensive check results, whether to write each service request included in the preprocessing block into the blockchain nodes of the server #3 and the server B1.

It can be learned from the previously described method that each blockchain node in the consensus network includes a plurality of servers. Therefore, as long as one of servers in each blockchain node is in an online state, in other words, is available, the blockchain node is an available blockchain node in the consensus network, which greatly improves stability of the blockchain node in the consensus network. In addition, each blockchain node includes a plurality of servers, and functions and statuses of the servers are the same for the blockchain node. In other words, compared with the existing technology, equivalent servers are added to the blockchain node. This greatly improves the performance of the blockchain node, and thus the service processing efficiency of the blockchain node is greatly improved.

It is worthwhile to note that in a service consensus process, each blockchain node in the consensus network can determine a check result obtained by the blockchain node for the preprocessing block, send the obtained check result to other blockchain nodes in the consensus network, and store the check result in a service memory corresponding to the blockchain node. The blockchain node can perform consensus check on the preprocessing block by using a first server included in the blockchain node, and the first server can be a specified server in the blockchain node, or can be a server selected from servers included in the blockchain node.

In addition, the blockchain node also receives a check result sent by other blockchain nodes in the consensus network for the preprocessing block. The blockchain node can receive, by using a server included in the blockchain node, the check result sent by the other blockchain nodes, and stores the received check result in the service memory corresponding to the blockchain node. Here, a server that receives the check result sent by the other blockchain nodes can be referred to as a second server. The second server can be any server in the blockchain node, and certainly, can be the previously described first server. Which second server to receive the check result sent by the other blockchain nodes depends on the second server that is selected, by a server included in the other blockchain nodes, to receive the check result sent by the other blockchains.

In step S101, in addition to randomly selecting an address from the stored addresses of the servers in the first blockchain node, the client can also select an address based on a load balancing status. Therefore, when pushing the addresses of the servers in the first blockchain node to the client, the registration center can jointly push load statuses of the servers to the client, so that the client selects an address of a lightly loaded server from the addresses by using a predetermined load balancing algorithm, and sends the service request to the server corresponding to the address.

Likewise, when sending the service request to each second blockchain node in the consensus network, the server in the first blockchain node can also select a server from the stored addresses based on load balancing method. Certainly, the server in the first blockchain node can also send the preprocessing block based on load balancing method, and each blockchain node in the consensus network can also send the check result and the comprehensive check result based on load balancing method. A specific process is the same as the method of sending the service request to the first blockchain node by the client based on load balancing method, and details are omitted here.

In this implementation of the present application, in addition to selecting a server that initiates service consensus by using the scheduled task trigger, consensus periods can be further respectively set in the servers in the blockchain node (including the first blockchain node and the second blockchain node), and different servers have different consensus periods. When detecting that a current time reaches a consensus period of the server, the server can obtain at least one service request from a service memory in the blockchain node that the server belongs to.

In this implementation of the present application, the server in the blockchain node (including the first blockchain node and the second blockchain node) can also forward the service request to other servers in the blockchain node after receiving the service request, and the other servers store the service request in a service memory included in the blockchain node. After receiving the preprocessing block sent by the first blockchain node, the server in each second blockchain node in the consensus network can also forward the preprocessing block to other servers in the second blockchain node for consensus check, and store the obtained check result in the service memory included in the second blockchain node.

The service consensus method according to the implementations of the present application is described above. Based on the same idea, an implementation of the present application further provides the following service processing devices and service consensus devices, which are shown in FIG. 6 to FIG. 12.

Figure 6:
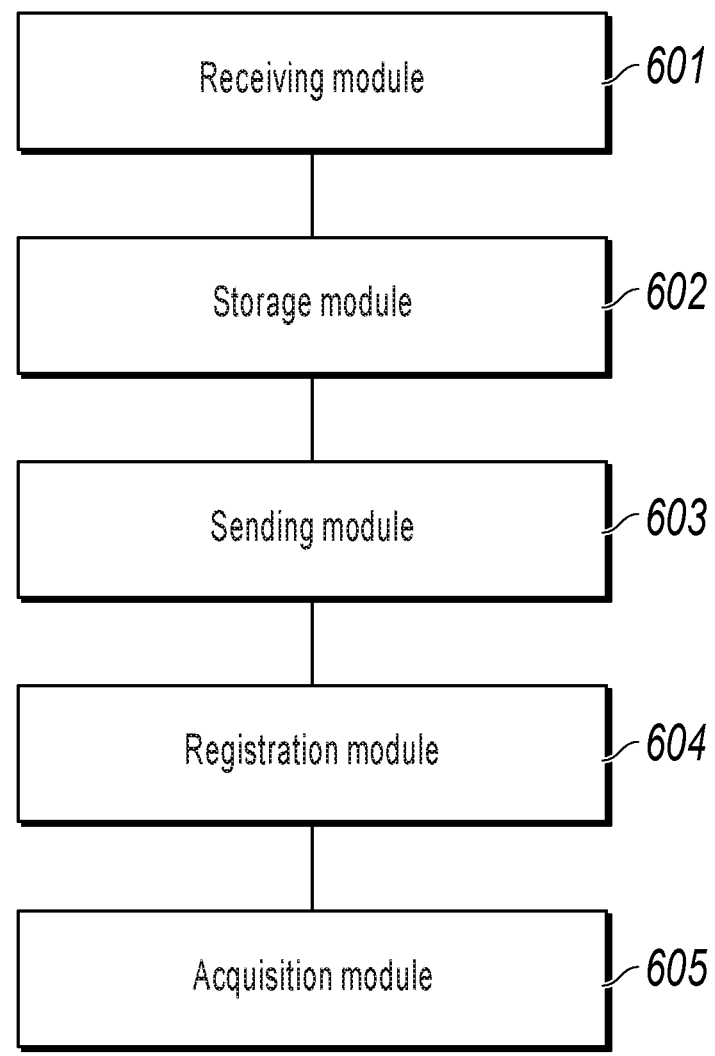
FIG. 6 is a schematic structural diagram illustrating a service processing device, according to an implementation of the present application.

FIG. 6 is a schematic structural diagram illustrating a service processing device, according to an implementation of the present application, specifically including the following: a receiving module 601, configured to receive a service request sent by a client; a storage module 602, configured to store the service request in a service memory corresponding to the device; and a sending module 603, configured to send the service request to each second blockchain node in a consensus network, so that each second blockchain node stores the service request in a service memory included in the second blockchain node after receiving the service request, where the second blockchain node includes a plurality of servers and at least one service memory.

The device further includes the following: a registration module 604, configured to send an address of the device to a registration center when it is determined that the device is online, so that the registration center sends the address to the client and each second blockchain node in the consensus network.

The device further includes the following: an acquisition module 605, configured to obtain addresses of the plurality of servers included in each second blockchain node from a registration center.

The sending module 603 is specifically configured to select an address from the obtained addresses of the plurality of servers included in each second blockchain node; and send the service request to a server corresponding to the selected address.

The storage module 602 is specifically configured to perform valid verification on the service request; and store the service request in the service memory when it is determined that the service request succeeds in the valid verification.

The storage module 602 is further configured to skip storing the service request when it is determined that the service request does not succeed in the valid verification.

A blockchain node includes a plurality of devices.

Figure 7:
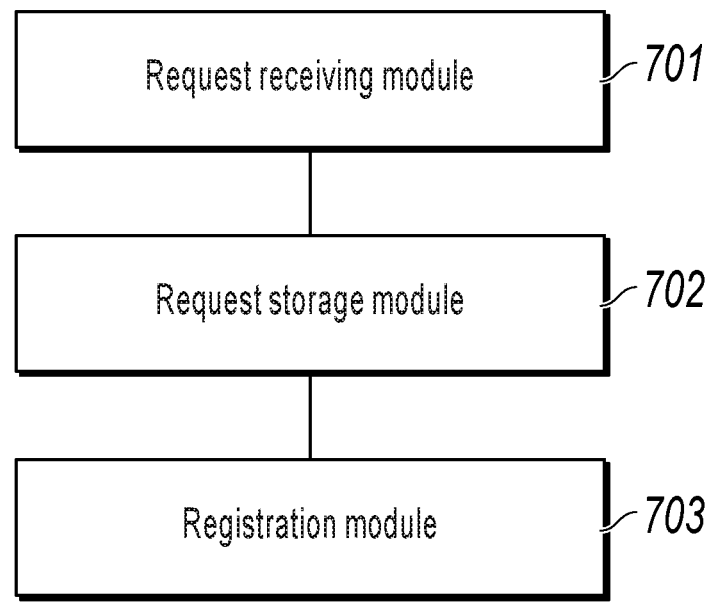
FIG. 7 is a schematic structural diagram illustrating a service processing device, according to an implementation of the present application.

FIG. 7 is a schematic structural diagram illustrating a service processing device, according to an implementation of the present application, specifically including the following: a request receiving module 701, configured to receive a service request sent by a first blockchain node, where the first blockchain node includes a plurality of servers and at least one service memory; and a request storage module 702, configured to store the service request in a service memory corresponding to the device.

The device further includes the following: a registration module 703, configured to send an address of the device to a registration center when it is determined that the device is online, so that the registration center sends the address to the first blockchain node, a client, and other second blockchain nodes in a consensus network.

The request storage module 702 is specifically configured to perform valid verification on the service request; and store the service request in the service memory when it is determined that the service request succeeds in the valid verification.

The request storage module 702 is further configured to skip storing the service request when it is determined that the service request does not succeed in the valid verification.

Figure 8:
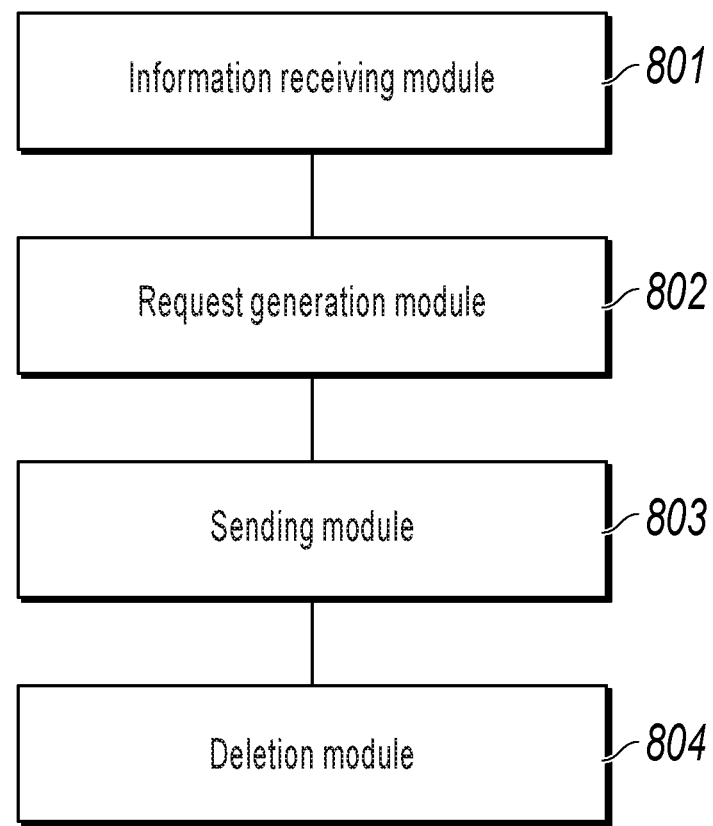
FIG. 8 is a schematic structural diagram illustrating a service processing device, according to an implementation of the present application.

FIG. 8 is a schematic structural diagram illustrating a service processing device, according to an implementation of the present application, specifically including the following: an information receiving module 801, configured to receive service information entered by a user; a request generation module 802, configured to generate a corresponding service request based on the service information; and a sending module 803, configured to send the service request to a server included in a first blockchain node, so that the first blockchain node stores the received service request in a service memory included in the first blockchain node; and send the service request to each second blockchain node in a consensus network, where the first blockchain node includes a plurality of servers and at least one service memory, and the second blockchain node includes a plurality of servers and at least one service memory.

The sending module 803 is specifically configured to obtain addresses of the plurality of servers included in the first blockchain node from a registration center; and select an address from the obtained addresses of the plurality of servers included in the first blockchain node, and send the service request to a server corresponding to the selected address.

The device further includes the following: a deletion module 804, configured to delete an address of a certain server when an offline notification sent by the registration center for the server is received.

Figure 9:
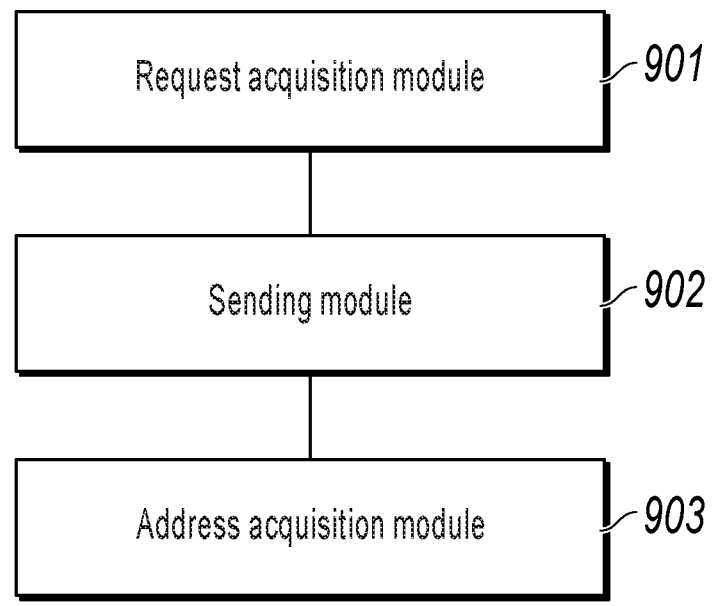
FIG. 9 is a schematic structural diagram illustrating a service consensus device, according to an implementation of the present application.

FIG. 9 is a schematic structural diagram illustrating a service consensus device, according to an implementation of the present application, specifically including the following: a request acquisition module 901, configured to obtain at least one service request from a service memory corresponding to the device; and a sending module 902, configured to package the at least one service request into a preprocessing block, and send the preprocessing block to each second blockchain node in a consensus network, so that each second blockchain node performs service consensus on the preprocessing block, where the second blockchain node includes a plurality of servers and at least one service memory.

The device further includes the following: an address acquisition module 903, configured to obtain addresses of the plurality of servers included in each second blockchain node from a registration center.

The sending module 902 is specifically configured to select an address from the obtained addresses of the plurality of servers included in each second blockchain node; and send the preprocessing block to a server corresponding to the selected address, so that the server corresponding to the selected address performs service consensus on the received preprocessing block.

Figure 10:
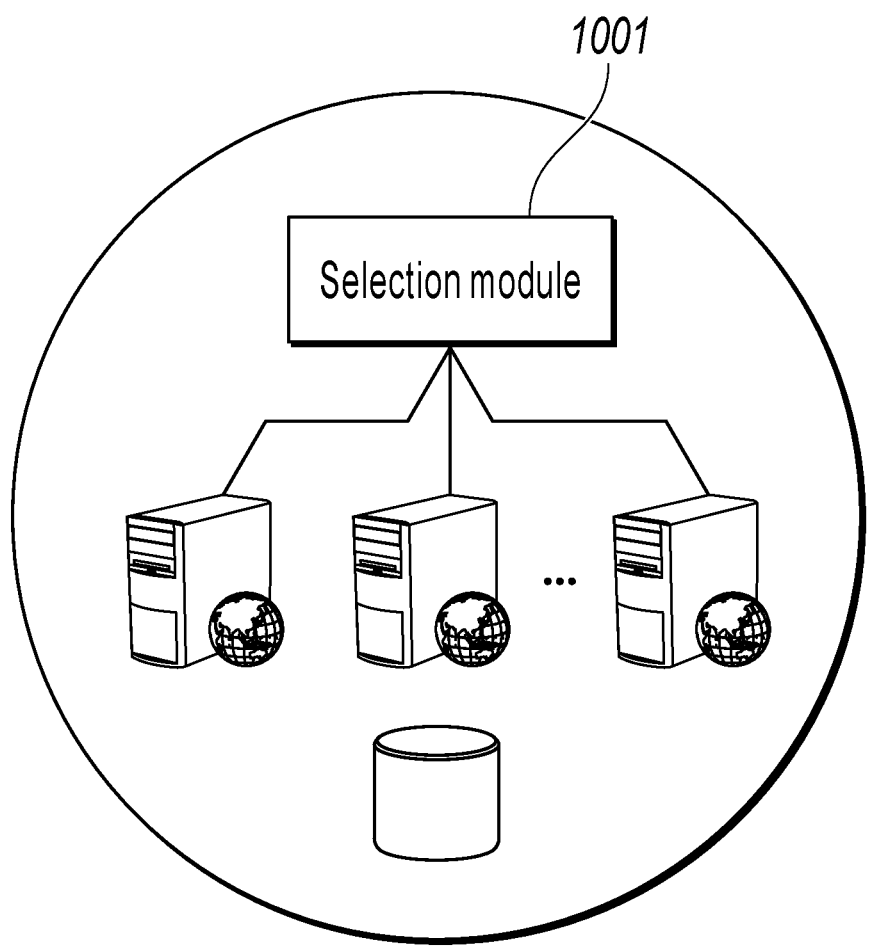
FIG. 10 is a schematic structural diagram illustrating a service consensus device, according to an implementation of the present application.

FIG. 10 is a schematic structural diagram illustrating a service consensus device, according to an implementation of the present application, specifically including the following: a selection module 1001, configured to select a server from a plurality of servers included in a first blockchain node, where the first blockchain node includes the plurality of servers and at least one service memory.

The selection module 1001 is specifically configured to detect whether a current moment satisfies a task trigger condition; and select the server from the plurality of servers included in the first blockchain node when detecting that the task trigger condition is satisfied.

Figure 11:
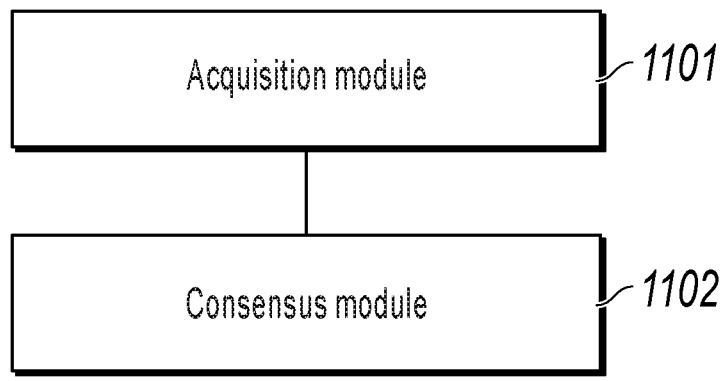
FIG. 11 is a schematic structural diagram illustrating a service consensus device, according to an implementation of the present application.

FIG. 11 is a schematic structural diagram illustrating a service consensus device, according to an implementation of the present application, specifically including the following: an acquisition module 1101, configured to obtain a preprocessing block; and a consensus module 1102, configured to perform service consensus on the preprocessing block based on each service request stored in a service memory corresponding to the device.

The consensus module 1102 is specifically configured to perform consensus check on the preprocessing block, to obtain a check result; receive each check result sent by other blockchain nodes in a consensus network, and store each received check result in the service memory corresponding to the device; and obtain each check result from the service memory, and perform service consensus on the preprocessing block by using each obtained check result.

Figure 12:
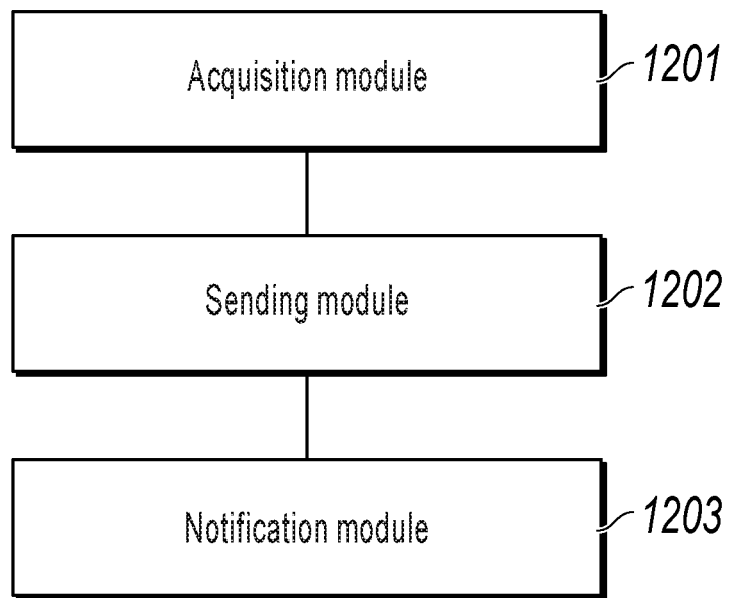
FIG. 12 is a schematic structural diagram illustrating a service consensus device, according to an implementation of the present application.

FIG. 12 is a schematic structural diagram illustrating a service consensus device, according to an implementation of the present application, specifically including the following: an acquisition module 1201, configured to obtain addresses of a plurality of servers included in each blockchain node in a consensus network, where each blockchain node includes the plurality of servers and at least one service memory; and a sending module 1202, configured to send the obtained addresses of the plurality of servers included in the blockchain node to other blockchain nodes in the consensus network and a client for storage.

The device further includes the following: a notification module 1203, configured to send a heartbeat detection message to the plurality of servers included in each blockchain node in the consensus network based on the obtained addresses of the plurality of servers included in the blockchain node; and when no response message returned by each server included in the blockchain node based on the heartbeat detection message is received after a specified time elapses, determine that the server is offline, and instruct the client and the other blockchain nodes in the consensus network to delete the stored address of the server.

The implementations of the present application provide a service processing and consensus method and device. In the method, a first blockchain node includes a plurality of servers. The first blockchain node can receive a service request sent by a client and store the service request by using the plurality of included servers, obtain at least one service request from a service memory included in the first blockchain node by using a server in the plurality of servers, to obtain a preprocessing block, and send the preprocessing block to each second blockchain node in a consensus network by using the server, to perform service consensus on the preprocessing block by using each second blockchain node. It can be ensured that the first blockchain node is available, provided that one server in the plurality of servers included in the first blockchain node is available. Therefore, stability of the first blockchain node in the consensus network is improved. In addition, each server included in the first blockchain node can receive the service request sent by a user by using the client, and each server can initiate service consensus to each second blockchain node in the consensus network. Therefore, service processing efficiency of a blockchain service is greatly improved.

In the 1990s, improvement of a technology can be clearly distinguished between hardware improvement (for example, improvement on a circuit structure such as a diode, a transistor, or a switch) and software improvement (improvement on a method procedure). However, with the development of technologies, improvement of many method procedures can be considered as direct improvement of a hardware circuit structure. Designers almost all program an improved method procedure to a hardware circuit, to obtain a corresponding hardware circuit structure. Therefore, it cannot be said that improvement of a method procedure cannot be implemented by using a hardware entity module. For example, a programmable logic device (PLD) (for example, a field programmable gate array (FPGA)) is such an integrated circuit. A logical function of the programmable logic device is determined by component programming executed by a user. The designers perform voluntary programming to "integrate" a digital system into a single PLD without requiring a chip manufacturer to design and produce a dedicated integrated circuit chip. In addition, instead of manually producing an integrated circuit chip, the programming is mostly implemented by "logic compiler" software, which is similar to a software compiler used during program development. Original code before compiling is also written in a specific programming language, which is referred to as a hardware description language (HDL), and there is more than one type of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language), etc. Currently, VHDL (Very-High-Speed Integrated Circuit Hardware Description Language) and Verilog are most commonly used. A person skilled in the art should also understand that a method procedure only needs to be logically programmed, and programmed to the integrated circuit by using the previous hardware description languages so that a hardware circuit that implements the logical method procedure can be easily obtained.

A controller can be implemented by using any appropriate method. For example, the controller can be a microprocessor or a processor, or a computer-readable medium, a logic gate, a switch, an application-specific integrated circuit (ASIC), a programmable logic controller, or an embedded microprocessor that stores computer readable program code (such as software or firmware) that can be executed by the microprocessor or the processor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that a controller can be implemented by using pure computer-readable program code, and the steps in the method can be logically programmed to enable the controller to further implement same functions in forms of a logic gate, a switch, an application-specific integrated circuit, a programmable logic controller, an embedded microcontroller, etc. Therefore, the controller can be considered as a hardware component, and a device that is included in the controller and that is configured to implement various functions can also be considered as a structure in the hardware component. Alternatively, a device configured to implement various functions can be considered as both a software module for implementing the method and a structure in the hardware component.

The system, device, module, or unit described in the described implementations can be implemented by a computer chip or an entity, or implemented by a product with a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the described device is described by dividing functions into various units. Certainly, when the present application is implemented, the functions of the units can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a disk memory, a CD-ROM, and an optical memory) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine so that the instructions executed by a computer or a processor of any other programmable data processing device generate a device for implementing a specific function in one or more processes in the flowcharts or in one or more blocks in the block diagrams.

These computer program instructions can be stored in a computer readable memory that can instruct the computer or any other programmable data processing device to work in a specific method, so that the instructions stored in the computer readable memory generate an artifact that includes an instruction device. The instruction device implements a specific function in one or more processes in the flowcharts and/or in one or more blocks in the block diagrams.

These computer program instructions can be loaded to a computer or other programmable data processing devices, so that a series of operations and steps are performed on the computer or the other programmable devices, generating computer-implemented processing. Therefore, the instructions executed on the computer or the other programmable devices provide steps for implementing a specific function in one or more processes in the flowcharts or in one or more blocks in the block diagrams.

In a typical configuration, the computing device includes one or more processors (CPU), one or more input/output interfaces, one or more network interfaces, and one or more memories.

The memory can include a non-persistent memory, a random access memory (RAM) and/or a nonvolatile memory in a computer readable medium, for example, a read-only memory (ROM) or a flash memory (flash RAM).

The computer readable medium includes persistent, non-persistent, movable, and unmovable media that can implement information storage by using any method or technology. Information can be a computer readable instruction, a data structure, a program module, or other data. A computer storage medium includes but is not limited to a parameter random access memory (PRAM), a static random access memory (SRAM), a dynamic random access memory (DRAM), a random access memory (RAM) of other types, a read-only memory (ROM), an electrically erasable programmable read-only memory (EEPROM), a flash memory or other memory technologies, a compact disc read-only memory (CD-ROM), a digital versatile disc (DVD) or other optical storages, a magnetic tape, a magnetic disk storage, other magnetic storage devices, or any other non-transmission media that can be used to store information that can be accessed by the computing device. Based on the definition in the present specification, the computer readable medium does not include transitory computer readable medium(transitory media), for example, a modulated data signal and carrier.

It is worthwhile to further note that the term "include", "contain", or their any other variant is intended to cover a non-exclusive inclusion, so that a process, a method, merchandise, or a device that includes a list of elements not only includes those elements but also includes other elements which are not expressly listed, or further includes elements inherent to such process, method, merchandise, or device. An element preceded by "includes a . . . " does not, without more constraints, preclude the existence of additional identical elements in the process, method, merchandise, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, and an optical memory) that include computer-usable program code.

The present application can be described in the general context of computer executable instructions executed by a computer, for example, a program module. Generally, the program module includes a routine, a program, an object, a component, a data structure, etc. for executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are all described in a progressive way. For the same or similar parts of the implementations, refer to the implementations. Each implementation focuses on a difference from other implementations. Particularly, a system implementation is basically similar to a method implementation, and therefore is described briefly. For related parts, refer to partial descriptions of the method implementation.

The previous descriptions are merely implementations of the present application, and are not intended to limit the present application. A person skilled in the art can make various modifications and changes to the present application. Any modification, equivalent replacement, improvement, etc. made within the spirit and principle of the present application shall fall within the scope of the claims of the present application.

This specification describes techniques for improving the stability and service processing efficiency of a blockchain node. For example, each blockchain node can include a corresponding plurality of servers. A registration center can be configured to manage addresses of servers in each blockchain node, and push the addresses of the servers to the client. The client can randomly select an address from the addresses pushed by the registration center, and send the service request to a server corresponding to the address. The registration center can also send the addresses of the servers in a blockchain node to each server in another blockchain node. The blockchain node can randomly select an address from the addresses of the other blockchain node, and send the service request to the other blockchain node based on the address. It can be ensured that the blockchain node is available, provided that one server in the plurality of servers included in the blockchain node is available. Therefore, stability of the blockchain node in the consensus network is greatly improved. In addition, each server included in the blockchain node can receive the service request sent by a client, and each server can initiate service consensus in the consensus network. Therefore, service processing efficiency of a blockchain service is greatly improved.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for service processing, the computer-implemented method comprising:
   receiving, by a first server of a first blockchain node in a consensus network, a service request sent by a client, wherein the consensus network further comprises a plurality of additional blockchain nodes, the first blockchain node and each node of the plurality of additional blockchain nodes of the consensus network comprising a corresponding plurality of servers;
   storing the service request in at least one service memory of the first blockchain node;
   obtaining, by the first blockchain node and from a registration center, addresses of each server of the corresponding plurality of servers for each node of the plurality of additional blockchain nodes in the consensus network; and
   sending the service request to each additional blockchain node in the consensus network based on the obtained addresses, wherein each additional blockchain node stores the service request in a corresponding at least one service memory after receiving the service request.

2. The computer-implemented method of claim 1, comprising:
   sharing, from the first server of the first blockchain node, node configuration information with a plurality of additional servers of the first blockchain node, wherein the node configuration information comprises a point-to-point routing table, an asymmetric public key, an asymmetric private key, and a node identity.

3. The computer-implemented method of claim 1, comprising:
   registering the first server of the first blockchain node with the registration center;
   receiving a message from the registration center; and
   in response to the message from the registration center, sending an address of the first server to the registration center.

4. The computer-implemented method of claim 1, wherein sending the service request to each additional blockchain node in the consensus network based on the obtained addresses comprises:
   selecting a first address from the addresses of the corresponding plurality of servers of the plurality of additional blockchain nodes; and
   sending the service request to the first address.

5. The computer-implemented method of claim 1, wherein storing the service request in the at least one service memory of the first blockchain node comprises:
   verifying the service request is valid; and
   storing the service request in the at least one service memory of the first blockchain node in response to verifying the service request is valid.

6. The computer-implemented method of claim 1, comprising:
   selecting, by the first blockchain node, the first server of the first blockchain node;
   obtaining, by the first server, at least one service request from the at least one service memory of the first blockchain node;
   packaging, by the first server, the at least one service request into a preprocessing block; and
   sending the preprocessing block to each additional blockchain node in the consensus network, wherein each additional blockchain node performs service consensus on the preprocessing block.

7. The computer-implemented method of claim 1, further comprising:
   receiving a heartbeat detection message by the first server of the first blockchain node from the registration center.

8. A non-transitory, computer-readable medium storing one or more instructions executable by a computer system to perform operations, comprising:
   receiving, by a first server of a first blockchain node in a consensus network, a service request sent by a client, wherein the consensus network further comprises a plurality of additional blockchain nodes, the first blockchain node and each node of the plurality of additional blockchain nodes of the consensus network comprising a corresponding plurality of servers;
   storing the service request in at least one service memory of the first blockchain node;
   obtaining, by the first blockchain node and from a registration center, addresses of each server of the corresponding plurality of servers for each node of the plurality of additional blockchain nodes in the consensus network; and
   sending the service request to each additional blockchain node in the consensus network based on the obtained addresses, wherein each additional blockchain node stores the service request in a corresponding at least one service memory after receiving the service request.

9. The non-transitory, computer-readable medium of claim 8, comprising:
sharing, from the first server of the first blockchain node, node configuration information with a plurality of additional servers of the first blockchain node, wherein the node configuration information comprises a point-to-point routing table, an asymmetric public key, an asymmetric private key, and a node identity.

10. The non-transitory, computer-readable medium of claim 8, comprising:
registering the first server of the first blockchain node with the registration center;
receiving a message from the registration center; and
in response to the message from the registration center, sending an address of the first server to the registration center.

11. The non-transitory, computer-readable medium of claim 8, wherein sending the service request to each additional blockchain node in the consensus network based on the obtained addresses comprises:
selecting a first address from the addresses of the corresponding plurality of servers of the plurality of additional blockchain nodes; and
sending the service request to the first address.

12. The non-transitory, computer-readable medium of claim 8, wherein storing the service request in the at least one service memory of the first blockchain node comprises:
verifying the service request is valid; and
storing the service request in the at least one service memory of the first blockchain node in response to verifying the service request is valid.

13. The non-transitory, computer-readable medium of claim 8, comprising:
selecting, by the first blockchain node, the first server of the first blockchain node;
obtaining, by the first server, at least one service request from the at least one service memory of the first blockchain node;
packaging, by the first server, the at least one service request into a preprocessing block; and
sending the preprocessing block to each additional blockchain node in the consensus network, wherein each additional blockchain node performs service consensus on the preprocessing block.

14. The non-transitory, computer-readable medium of claim 8, further comprising:
receiving a heartbeat detection message by the first server of the first blockchain node from the registration center.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a first server of a first blockchain node in a consensus network, a service request sent by a client, wherein the consensus network further comprises a plurality of additional blockchain nodes, the first blockchain node and each node of the plurality of additional blockchain nodes of the consensus network comprising a corresponding plurality of servers;
storing the service request in at least one service memory of the first blockchain node;
obtaining, by the first blockchain node and from a registration center, addresses of each server of the corresponding plurality of servers for each node of the plurality of additional blockchain nodes in the consensus network; and
sending the service request to each additional blockchain node in the consensus network based on the obtained addresses, wherein each additional blockchain node stores the service request in a corresponding at least one service memory after receiving the service request.

16. The computer-implemented system of claim 15, comprising:
sharing, from the first server of the first blockchain node, node configuration information with a plurality of additional servers of the first blockchain node, wherein the node configuration information comprises a point-to-point routing table, an asymmetric public key, an asymmetric private key, and a node identity.

17. The computer-implemented system of claim 15, comprising:
registering the first server of the first blockchain node with the registration center;
receiving a message from the registration center; and
in response to the message from the registration center, sending an address of the first server to the registration center.

18. The computer-implemented system of claim 15, wherein sending the service request to each additional blockchain node in the consensus network based on the obtained addresses comprises:
selecting a first address from the addresses of the corresponding plurality of servers of the plurality of additional blockchain nodes; and
sending the service request to the first address.

19. The computer-implemented system of claim 15, wherein storing the service request in the at least one service memory of the first blockchain node comprises:
verifying the service request is valid; and
storing the service request in the at least one service memory of the first blockchain node in response to verifying the service request is valid.

20. The computer-implemented system of claim 15, comprising:
selecting, by the first blockchain node, the first server of the first blockchain node;
obtaining, by the first server, at least one service request from the at least one service memory of the first blockchain node;
packaging, by the first server, the at least one service request into a preprocessing block; and
sending the preprocessing block to each additional blockchain node in the consensus network, wherein each additional blockchain node performs service consensus on the preprocessing block.

* * * * *